(12) United States Patent
Chun et al.

(10) Patent No.: US 12,519,179 B2
(45) Date of Patent: Jan. 6, 2026

(54) BATTERY PACK AND DEVICE INCLUDING THE SAME

(71) Applicant: LG ENERGY SOLUTION, LTD., Seoul (KR)

(72) Inventors: Yongho Chun, Daejeon (KR); Donghyun Kim, Daejeon (KR); Byung Do Jang, Daejeon (KR); Hyoungsuk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 760 days.

(21) Appl. No.: 17/793,827

(22) PCT Filed: Mar. 26, 2021

(86) PCT No.: PCT/KR2021/003761
§ 371 (c)(1),
(2) Date: Jul. 19, 2022

(87) PCT Pub. No.: WO2021/210805
PCT Pub. Date: Oct. 21, 2021

(65) Prior Publication Data
US 2023/0361417 A1    Nov. 9, 2023

(30) Foreign Application Priority Data
Apr. 14, 2020    (KR) .................. 10-2020-0044968

(51) Int. Cl.
*H01M 50/342* (2021.01)
*H01M 50/211* (2021.01)
*H01M 50/271* (2021.01)

(52) U.S. Cl.
CPC ..... *H01M 50/3425* (2021.01); *H01M 50/211* (2021.01); *H01M 50/271* (2021.01)

(58) Field of Classification Search
CPC .......... H01M 50/3425; H01M 50/211; H01M 50/271; H01M 50/367; H01M 50/204;
(Continued)

(56) References Cited

U.S. PATENT DOCUMENTS

2009/0286138 A1    11/2009  Shimamori
2012/0288738 A1*   11/2012  Yasui .................. H01M 50/262
                                                          429/82
(Continued)

FOREIGN PATENT DOCUMENTS

CN    102473884 A    5/2012
CN    102656718 A    9/2012
(Continued)

OTHER PUBLICATIONS

Extended European Search Report for European Application No. 21788365.1, dated Jul. 12, 2024.
(Continued)

*Primary Examiner* — Kiran Quraishi Akhtar
(74) *Attorney, Agent, or Firm* — Birch, Stewart, Kolasch & Birch, LLP (57) ABSTRACT

A battery pack includes a plurality of battery modules; a vent frame disposed along the edges of the plurality of battery modules; and a housing accommodating the plurality of battery modules and the vent frame, wherein the vent frame includes a pair of vertical beams formed parallel to a first direction and a pair of horizontal beams formed parallel to a second direction intersecting the first direction, the vertical beam and the horizontal beam each having a shape of a tube and including a cover formed on the vertical beam or the horizontal beam in a length direction, and a passage surrounded by the cover for gas to pass through.

15 Claims, 8 Drawing Sheets

(58) Field of Classification Search
CPC .... H01M 50/30; H01M 50/342; H01M 50/20; H01M 50/394; H01M 2200/20; Y02E 60/10
See application file for complete search history.

(56) References Cited

U.S. PATENT DOCUMENTS

| | | | |
|---|---|---|---|
| 2014/0113167 | A1 | 4/2014 | Itoi et al. |
| 2018/0108892 | A1 | 4/2018 | Kim et al. |
| 2018/0111499 | A1 | 4/2018 | Wada et al. |
| 2019/0067659 | A1 | 2/2019 | Karulkar et al. |
| 2019/0097192 | A1 | 3/2019 | Kim et al. |
| 2019/0140235 | A1 | 5/2019 | Lindstrom et al. |
| 2020/0091484 | A1 | 3/2020 | Guen |
| 2020/0185672 | A1 | 6/2020 | Seo et al. |
| 2022/0059901 | A1 | 2/2022 | Ren et al. |
| 2024/0250359 | A1 | 7/2024 | He et al. |

FOREIGN PATENT DOCUMENTS

| | | |
|---|---|---|
| CN | 107972474 A | 5/2018 |
| CN | 108695458 A | 10/2018 |
| CN | 109428030 A | 3/2019 |
| CN | 109565096 A | 4/2019 |
| CN | 110165113 A | 8/2019 |
| CN | 110379963 A | 10/2019 |
| CN | 209963101 U | 1/2020 |
| CN | 110190212 B | 2/2020 |
| CN | 110190211 B | 3/2020 |
| DE | 10 2014 225 845 A1 | 6/2016 |
| EP | 2 654 100 A1 | 10/2013 |
| EP | 3 782 837 A1 | 2/2021 |
| EP | 3 783 688 A1 | 2/2021 |
| EP | 3 905 377 A1 | 11/2021 |
| JP | 2012-79510 A | 4/2012 |
| JP | 2012-212659 A | 11/2012 |
| JP | 2018-18726 A | 2/2018 |
| JP | 2020-42982 A | 3/2020 |
| KR | 10-2009-0002428 A | 1/2009 |
| KR | 10-0949069 B1 | 3/2010 |
| KR | 10-1106111 B1 | 1/2012 |
| KR | 10-2017-0074543 A | 6/2017 |
| KR | 10-2019-0036260 A | 4/2019 |
| WO | WO 2012/081137 A1 | 6/2012 |
| WO | WO 2014/065110 A1 | 5/2014 |

OTHER PUBLICATIONS

International Search Report (PCT/ISA/210) issued in PCT/KR2021/003761, dated Jul. 8, 2021.

\* cited by examiner

BATTERY PACK AND DEVICE INCLUDING THE SAME

TECHNICAL FIELD

Cross-Citation with Related Application(s)

This application claims the benefit of priority based on Korean Patent Application No. 10-2020-0044968 dated Apr. 14, 2020, and all contents disclosed in the document of the Korean patent application are incorporated as a part of this specification.

The present invention relates to a battery pack and a device including the same, and more particularly, to a battery pack having improved safety and a device including the same.

BACKGROUND ART

A secondary battery which may be easily applied based on a product group and have an electrical characteristic such as high energy density or the like may be generally applied to an electric vehicle or hybrid vehicle, driven by an electric drive source, as well as a portable device, a power storage device or the like. This secondary battery has been spotlighted as a new energy source for improving eco-friendliness and energy efficiency not only for its primary advantage in which the secondary battery may significantly reduce use of a fossil fuel but also for the fact that no by-product occurs from use of energy.

A secondary battery currently commercialized may include a nickel cadmium battery, a nickel hydride battery, a nickel zinc battery and a lithium secondary battery. Among these batteries, the lithium secondary battery may be in spotlight because of having little memory effect compared to the nickel-based secondary batteries, thus having its free charging and discharging, very low self-discharge rate and high energy density.

The lithium secondary battery may mainly use a lithium-based oxide and a carbon material as a positive electrode active material and a negative electrode active material, respectively. The lithium secondary battery may include an electrode assembly in which a positive electrode plate and a negative electrode plate to which the positive electrode active material and the negative electrode active material are respectively applied are disposed while having a separator interposed therebetween, and a casing sealing and housing the electrode assembly together with an electrolyte, that is, a battery case.

In general, the lithium secondary battery may be classified into a prismatic secondary battery in which the electrode assembly is embedded in a metal can, and a pouch-type secondary battery in which the electrode assembly is embedded in a pouch of an aluminum laminate sheet, based on a type of the casing.

The secondary battery used in a small device may have two or three battery cells disposed therein. However, the secondary battery used in a medium to large-sized device such as an automobile may use a battery module in which a plurality of battery cells are electrically connected to each other. Such a battery module in which the plurality of battery cells are connected in series or parallel to each other to form a battery cell stack may have improved capacity and output. In addition, the plurality of battery modules may be mounted together with various control and protection systems such as a battery management system (BMS) and a cooling system to form a battery pack.

The battery pack may have a structure in which the plurality of battery modules are combined to each other, and the safety and operational efficiency of the battery pack may thus be problematic when some battery modules have overvoltage, overcurrent or overheating occurring therein. In particular, there is a trend in which the battery pack has a gradually increased capacity to improve a mileage. In a state where internal energy of the pack is also increased, it is thus necessary to design a structure to satisfy a strengthened safety standard and to secure safeties of a vehicle and a driver. To this end, there is an emerging need especially for a structure which may prevent internal thermal runaway or the like in advance or suppress transfer between the modules to minimize damage even when the runaway or the like occurs.

DISCLOSURE

Technical Problem

An exemplary embodiment of the present invention provides a battery pack which may suppress transfer between battery modules to minimize damage even when some modules in a battery have overvoltage, overcurrent or overheating occurring therein.

However, technical problems to be solved by an exemplary embodiment of the present invention are not limited to the aforementioned problems, and may be variously expanded in the scope of a technical idea included in the present invention.

Technical Solution

According to an exemplary embodiment of the present invention, a battery pack includes: a plurality of battery modules; a vent frame disposed along edges of the plurality of battery modules; and a housing accommodating the plurality of battery modules and the vent frame, wherein the vent frame includes a pair of vertical beams formed parallel to a first direction and a pair of horizontal beams formed parallel to a second direction intersecting the first direction, and wherein the vertical beam and the horizontal beam each have a shape of a tube and include a cover formed on the vertical beam or the horizontal beam in a length direction, and a passage surrounded by the cover for gas to pass through.

Each of the battery modules may include a battery cell stack in which a plurality of battery cells are stacked, a module frame accommodating the battery cell stack, and wherein an end plate covering the battery cell stack exposed to each of two ends of the module frame, and the end plate may include at least one vent gate formed in the shape of a tube externally protruding from the end plate and communicating with the inside of the battery module.

The cover of the horizontal beam may include at least one first connection hole opposite to one of the plurality of battery modules, and wherein the vent gate may be formed opposite to the at least one first connection hole for the vent gate and the horizontal beam to communicate with each other.

The cover of any one of the vertical beam and the horizontal beam may include a second connection hole formed at a portion where the vertical beam and the horizontal beam intersect with each other and communicating with the passage of any one of the vertical beam and the horizontal beam.

The battery pack may further include at least one burst portion formed on the outside of any one of the horizontal beam and the vertical beam and connected to the passage.

The vent gate, the at least one first connection hole, the passage of the horizontal beam, the second connection hole and the passage of the vertical beam may be connected with one another.

The housing may include a lower housing including a bottom surface on which the plurality of battery modules are disposed and a side wall extended upward from the bottom surface, and an upper cover covering an opening of an upper portion of the lower housing, and wherein the burst portion may be coupled to the horizontal beam or the vertical beam while having the side wall of the lower housing interposed therebetween.

The burst portion may be connected to the passage of the horizontal beam or vertical beam, and may be configured to burst when a pressure of introduced gas is a predetermined pressure or more.

The cover of the vertical beam may include a first inner cover disposed adjacent to the battery module in the second direction, and a first outer cover disposed away from the battery module in the second direction, and at least one of the first inner cover and the first outer cover may include a groove elongated in the first direction.

The first inner cover may include two second connection holes positioned at ends of one surface thereof adjacent to the battery module in the second direction, the ends being adjacent to the horizontal beam.

The groove elongated in the first direction may form the passage as the first inner cover and the first outer cover are coupled with each other.

The cover of the horizontal beam may include a second inner cover disposed adjacent to the battery module in the first direction, and a second outer cover disposed away from the battery module in the first direction, and wherein at least one of the second inner cover and the second outer cover may include a groove elongated in the second direction.

The second inner cover may include at least one first connection hole formed in one surface thereof adjacent to the battery module in the first direction.

The battery pack may include a burst portion disposed on the outside of the second outer cover in the first direction and connected to the passage of the horizontal beam, wherein the second outer cover includes at least one third connection hole for its communication with the burst portion.

The groove elongated in the second direction may form the passage as the second inner cover and the second outer cover are coupled with each other.

According to another exemplary embodiment of the present invention, a device may include at least one battery pack described above.

Advantageous Effects

The exemplary embodiments of the present invention may minimize the damage because the flame is moved along the vent frame to be emitted to the outside, rather than being transferred randomly, even when some modules in the battery have the overvoltage, overcurrent or overheating occurring therein, thereby improving the safety of the battery pack.

MODE FOR INVENTION

Hereinafter, exemplary embodiments of the present invention are described in detail with reference to the accompanying drawings so that those skilled in the art to which the present invention pertains may easily practice the present invention. The present invention may be implemented in various different forms and is not limited to exemplary embodiments provided herein.

A portion unrelated to the description is omitted in order to obviously describe the present invention, and the same or similar components are denoted by the same reference numeral throughout the present specification.

In addition, the size and thickness of each component shown in the accompanying drawings are arbitrarily shown for convenience of explanation, and therefore, the present invention is not necessarily limited to contents shown in the accompanying drawings. The thicknesses are exaggerated in the drawings in order to clearly represent several layers and regions. In addition, in the drawings, the thicknesses of some layers and regions are exaggerated for convenience of explanation.

In addition, when an element such as a layer, a film, a region or a substrate is referred to as being on "above" another element, it may be "directly on" another element or may have a third element interposed therebetween. On the contrary, when an element is referred to as being "directly on" another element, there is no third element interposed therebetween. In addition, when referred to as being "on" or "above" a reference element, an element may be positioned on or below the reference element, and may not necessarily be "on" or "above" the reference element toward an opposite direction of gravity.

Further, throughout the present specification, unless especially described to the contrary, "including" any components may be understood to imply the inclusion of other elements rather than the exclusion of any other elements.

Furthermore, throughout the specification, the word "on the plane" may indicate a case where a target is viewed from the top, and the word "on the cross section" may indicate a case where a cross section of a target taken along a vertical direction is viewed from the side.

Hereinafter, the description describes a battery pack according to an exemplary embodiment of the present invention.

Figure 1:
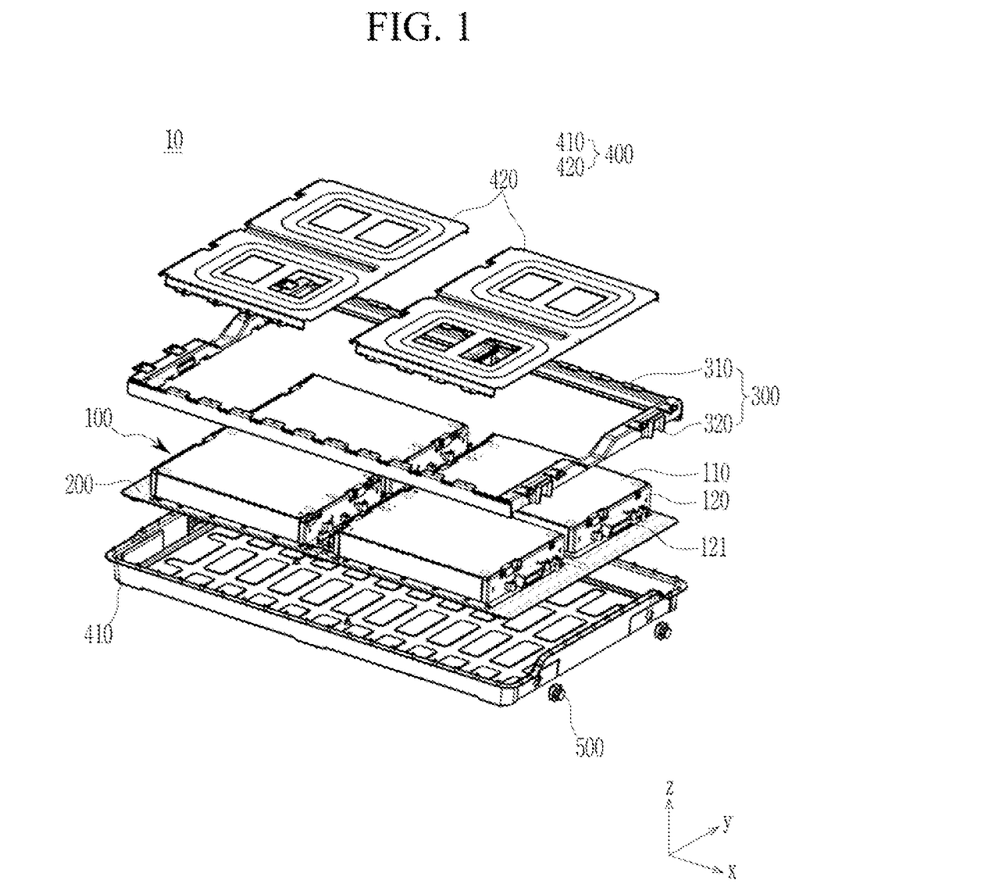
FIG. 1 is an exploded perspective view of a battery pack according to an exemplary embodiment of the present invention.

FIG. 1 is an exploded perspective view of a battery pack according to an exemplary embodiment of the present invention.

Referring to FIG. 1, a battery pack 10 according to an exemplary embodiment of the present invention may include a plurality of battery modules 100 and a vent frame 300 disposed along edges of the battery modules 100. The plurality of battery modules 100 and the vent frame 300 may be mounted on a pack tray 200 to be accommodated in a housing 400. The housing 400 may include a lower housing 410 accommodating the pack tray 200, and an upper cover 420 coupled to the lower housing 410 to cover an upper portion of the battery module 100.

The plurality of battery modules 100 may each include a battery cell stack (not shown) disposed in a module frame 110, and an end plate 120 covering the battery ell stack exposed to each of two ends of the module frame 110. Here, either one of the two end plates 120 may include a vent gate 121 communicating with the inside of the battery module 100 to emit flame or heat that may occur therein. The vent gate 121 may be disposed in the battery pack 10 to face the outside of the battery pack 10, and may preferably be disposed in each of the two ends of the battery pack 10 in a first direction (x-axis direction) to face the outside.

The vent frame 300 may be disposed along the edges of all of the plurality of battery modules 100. The vent frame 300 may have a shape of a tube formed along each side of the battery pack 10, and may include a pair of vertical beams 310 and a pair of horizontal beams 320, respectively extended in the first direction (x-axis direction) and a second direction (y-axis direction) and formed to communicate with each other as a whole. A detailed configuration of the vent frame 300 is described below.

The plurality of battery modules 100 and the vent frame 300 may be mounted on the pack tray 200, and fixed to the pack tray 200 by a fixing means when necessary. The battery module 100, the vent frame 300 and the pack tray 200 may be accommodated in the lower housing 410. The lower housing 410 may include a bottom surface on which the pack tray 200 is disposed, and a side wall extended upward from an edge of the bottom surface. The upper cover 420 covering the upper portion of the battery module 100 may be coupled to the lower housing 410 to protect an internal electric field. Here, the housing 400 may include various control and protection systems such as a battery management system (BMS) and a cooling system together with the battery module 100 mounted therein.

At least one burst portion 500 which may emit heat or flame occurring in the lower housing 410 to the outside may be formed on one sidewall of the lower housing 410. A detailed configuration of the burst part 500 is described below.

Hereinafter, the vent frame of the battery pack according to an exemplary embodiment of the present invention is described in more detail.

Figure 2:
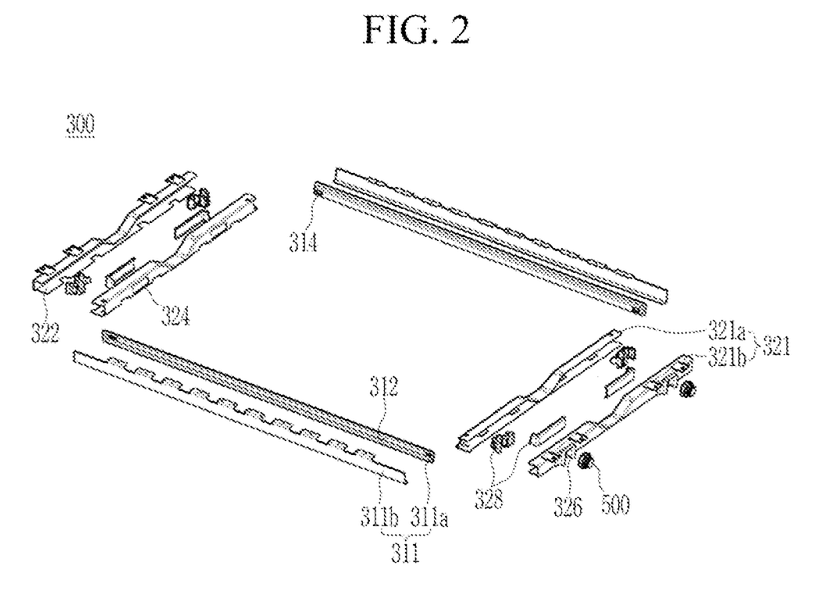
FIG. 2 is an exploded perspective view of a vent frame in the battery pack according to an exemplary embodiment of the present invention.

FIG. 2 is an exploded perspective view of a vent frame in the battery pack according to an exemplary embodiment of the present invention.

Referring to FIGS. 1 and 2, the vent frame 300 may have the shape of a tube formed along each side of the battery pack 10, and may include the pair of vertical beams 310 and the pair of horizontal beams 320, respectively extended in the first direction (x-axis direction) and the second direction (y-axis direction) and formed to communicate with each other as a whole The vertical beam 310 may have the shape of a tube elongated in the first direction (x-axis direction), and here include a cover 311 defining the tubular-shaped inside, and a passage 312 formed inside the cover. The cover 311 may include a first inner cover 311a disposed adjacent to the battery module 100 in the second direction (y-axis direction), and a first outer cover 311b disposed opposite to the first inner cover 311a to be away from the battery module 100 in the second direction (y-axis direction). At least one of the first inner cover 311a and the first outer cover 311b may include a groove elongated in the first direction, That is, a cross section of at least one cover may have a U-shape (shape in which one surface is removed from a rectangular tube shape), and the other cover may be coupled thereto, thereby defining the passage 312. However, the present invention is not limited thereto, and is not particularly limited as long as the tubular shape may be obtained by the cover 311.

The horizontal beam 320 may have the shape of a tube elongated in the second direction (y-axis direction), and here include a cover 321 defining the tubular-shaped inside, and a passage 322 formed inside the cover. The cover 321 may include a second inner cover 321a disposed adjacent to the battery module 100 in the first direction (x-axis direction), and a second outer cover 321b disposed opposite to the second inner cover 321a to be away from the battery module 100 in the first direction (x-axis direction). At least one of the second inner cover 321a and the second outer cover 321b may include a groove elongated in the second direction. That is, a cross section of at least one cover may have a U-shape (shape in which one surface is removed from the rectangular tube shape), and the other cover may be coupled thereto, thereby defining the passage 322. In particular, in this exemplary embodiment, both the second inner cover 321a and the second outer cover 321b may have the U-shaped cross section as shown in Fla 2, thereby allowing the horizontal beam 320 to have improved strength when assembled. However, the present invention is not limited thereto, and is not particularly limited as long as the tubular shape may be obtained by the cover 321.

The horizontal beam 320 may include a first connection hole 324 formed in its surface opposite to the battery module 100, that is, in one surface of the second inner cover 321a. The first connection hole 324 may be disposed to communicate with the vent gate 121 of the battery module 100 described above. In addition, the horizontal beam 320 may further include a third connection hole 326 formed in its surface disposed in a direction away from the battery module 100 in the second direction, that is, in one surface of the second outer cover 321b. The third connection hole 326 may be disposed to allow the burst portion 500 and passage 322 to communicate with each other. Here, the vent gate 121 the passage 322 of the horizontal beam 320 and the burst portion 500 may be coupled with one another by a vent path bracket 328 to guide their communication path.

The vertical beam 310 may include second connection holes 314 formed at both ends of the first inner cover 311a, adjacent to the horizontal beam 320. The passage 322 of the horizontal beam 320 and the passage 312 of the vertical beam 310 may communicate with each other through the second connection hole 314.

The burst portion 500 may be connected to the passage 322 of the horizontal beam 320, and include a burst surface 510 (shown in FIG. 5b) configured to burst when a pressure of introduced gas becomes a predetermined pressure or more. In addition, the burst portion 500 may include a wing portion 520 (shown in FIG. 5b) configured to protrude from a body on which the burst surface 510 is formed and to be coupled with the side wall of the lower housing 410. The wing portion 520 may be fixed to the lower housing 410 by a fastening means such as a screw. In this exemplary embodiment, the burst portion 500 may be connected to the passage 322 of the horizontal beam 320, and fixed to the horizontal beam 320 while having the lower housing 410 interposed therebetween. However, the present invention is not limited thereto, and may appropriately employ any configuration communicating with the passage of the vent frame 300 to enable the flame or heat to be emitted to the outside. In addition, this exemplary embodiment shows that two burst portions 500 are formed on only one side of the pair of horizontal beams 320, and is not limited thereto. The burst portion may also be formed on the other side of the pair of horizontal beams 320, or may be formed on the vertical beam 310. Here, the position and number of the burst portion may be appropriately selected when necessary.

By the above configuration, the passage may be formed to communicate as a whole in the vent frame 300 having the rectangular shape by including the vertical beam 310 and the horizontal beam 320. This passage may communicate with the vent gate 121 and burst portion 500 of the battery module 100, and minimize an affect on neighboring battery modules by inducing heat and flame to the outside when thermal runaway occurs from the battery module 100. Here, flame included in an occurring high-pressure venting gas may be entirely burned while passing through the passage in the vent frame 300 and emitted to the outside in a safer state. In addition, the vent frame 300 may serve as a support frame stably supporting the battery module 100 in normal times, other than when the thermal runaway occurs, thereby improving stability of the battery pack 10.

Hereinafter, the description describes a path to control an issue such as overvoltage, overcurrent or overheating when the same occurs in some battery modules in the battery pack.

Figure 3:
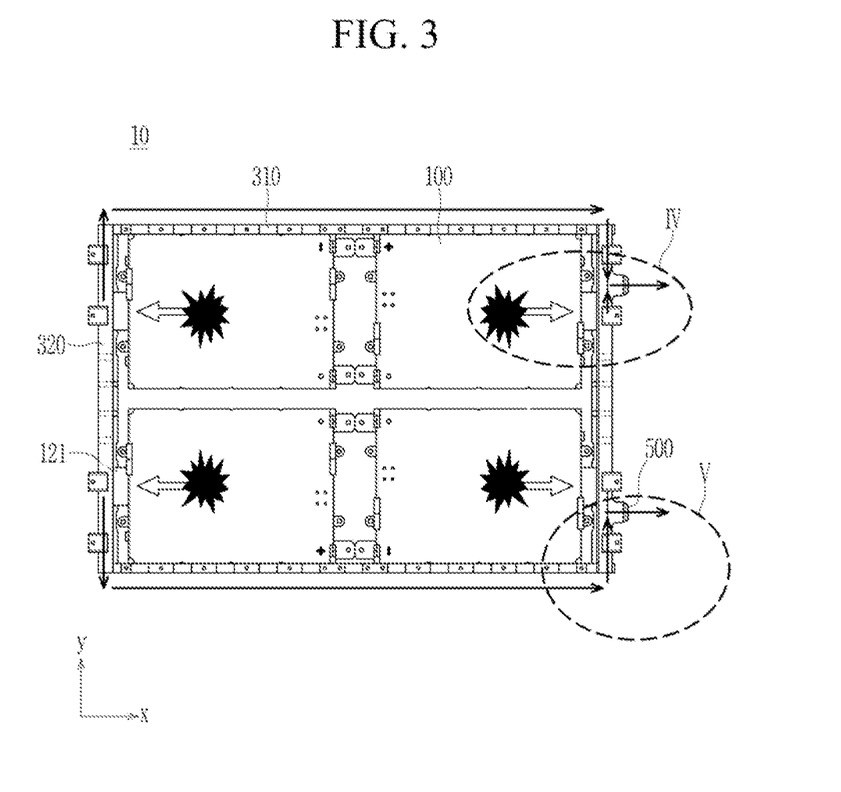
FIG. 3 is a view schematically showing a transfer path when thermal runaway occurs in some modules in the battery pack according to an exemplary embodiment of the present invention.
Figure 4:
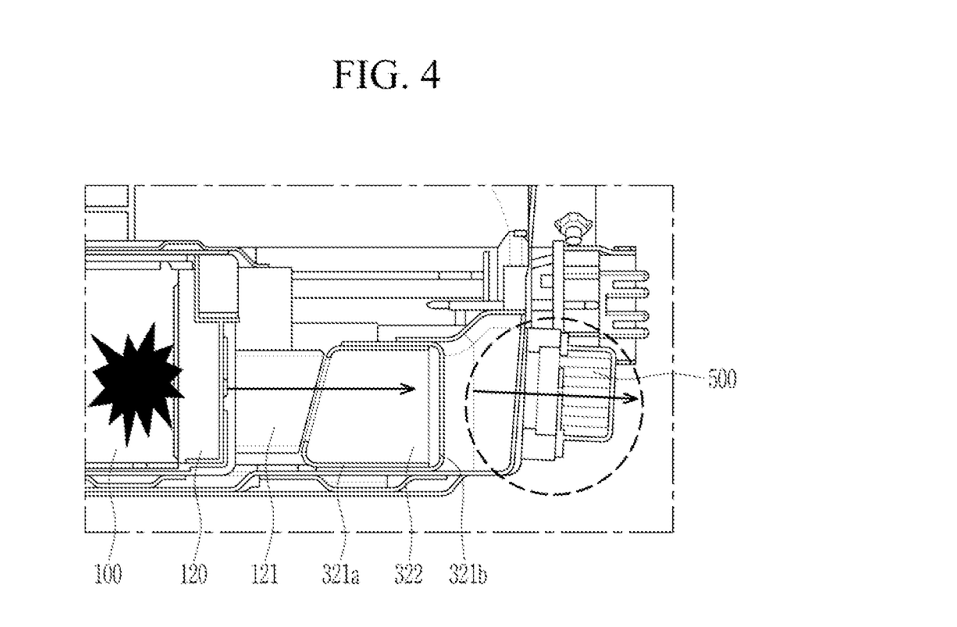
FIG. 4 is an enlarged view of portion IV of FIG. 3.

FIG. 3 is a view schematically showing a transfer path when thermal runaway occurs in some modules in the battery pack according to an exemplary embodiment of the present invention; FIG. 4 is an enlarged view of portion IV of FIG. 3; and FIGS. 5A and 5B are enlarged views of portion V of FIG. 3.

Referring to FIGS. 1 to 5B, the high-pressure venting gas may be emitted from the inside of the battery module 100 through the vent gate 121 when the (thermal) issue such as the overvoltage, overcurrent or overheating occurs in the battery module 100. Here, gas and flame in high temperature and high pressure may be induced to the first connection hole 324 positioned closest to the vent gate 121 of the battery module 100 in which the thermal issue occurs. The gas and flame in the high temperature and high pressure, introduced through the first connection hole 324, may be emitted to the outside along the passage formed in the vent frame 300.

For example, when the thermal issue occurs in the battery module 100 disposed at position 1 in FIG. 3, the gas and flame in the high pressure may be emitted through the vent gate 121 as shown in FIG. 4, pass through the passage 322 of the horizontal beam 320, and then be directly induced toward the burst portion 500 to be emitted to the outside. Accordingly, the thermal issue occurring in the battery module 100 disposed at position 1 may be emitted to the outside without affecting the neighboring modules.

Figure 5A:
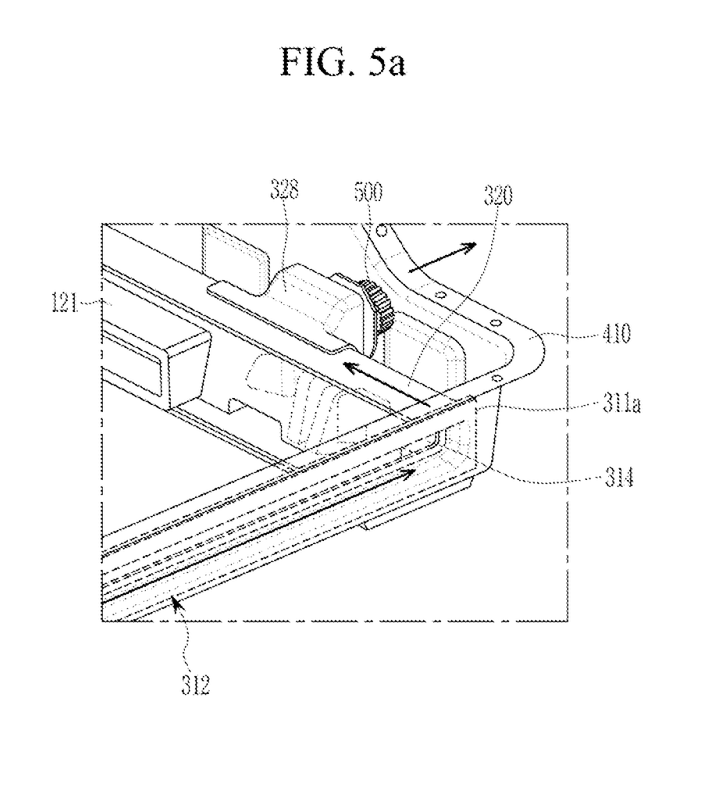
FIGS. 5a and 5b are enlarged views of portion V of FIG. 3.
Figure 5B:
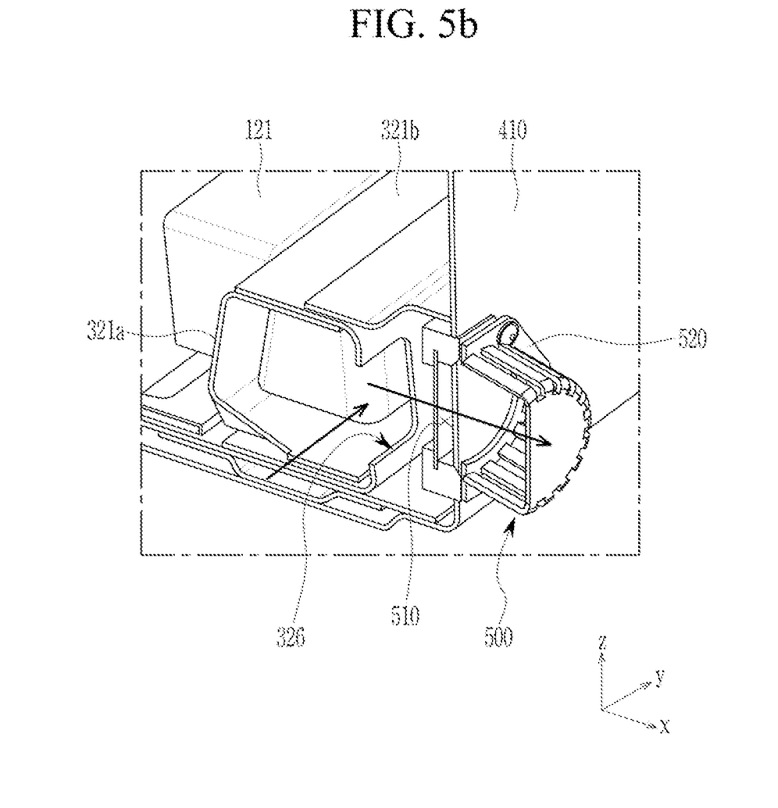

In addition, when the thermal issue occurs in the battery module 100 disposed at position 2 in FIG. 3, the gas and flame in the high temperature and high pressure may be emitted through the vent gate 121 to be introduced into the passage 322 of the horizontal beam 320, as shown in FIGS. 5A and 5B. Then, the gas and flame in the high temperature and high pressure introduced into the passage 312 of the vertical beam 310 through the second connection hole 314, and then moved along the passage 312 may be induced to the horizontal beam 320 disposed close to the burst portion 500 through the second connection hole 314 formed at the opposite end of the corresponding vertical beam 310 to be finally emitted to the outside through the burst portion 500.

That when the thermal issue occurs in the battery module 100, the gas and flame in the high temperature and high pressure may be induced to the passage of the vent frame 300 through the first connection hole 324 positioned closest to the vent gate 121 of the corresponding battery module 100 to be finally emitted to the outside.

Figure 6A:
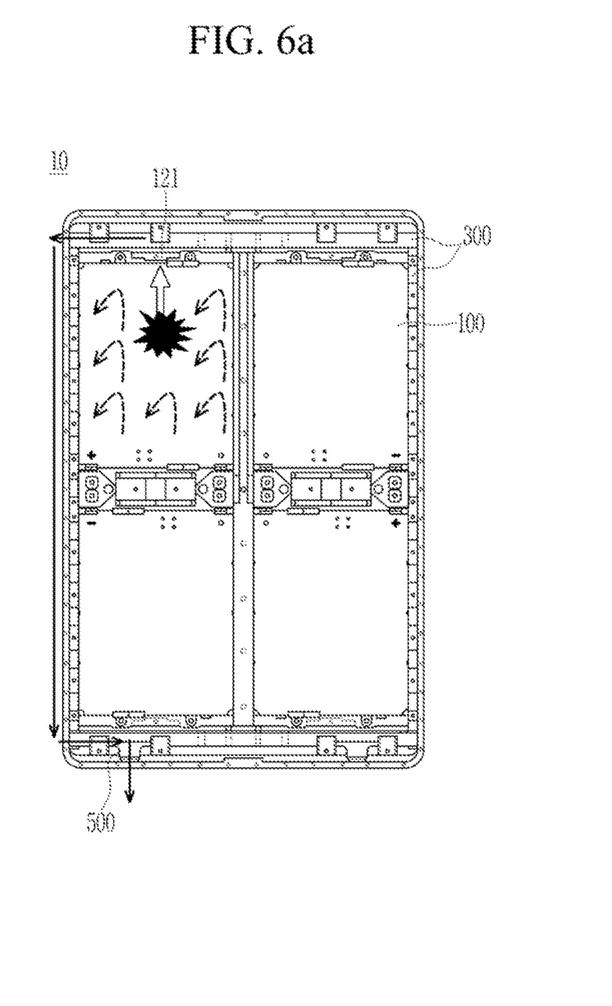
FIGS. 6a and 6b are views each schematically showing a transfer path when thermal runaway occurs in some modules in the battery pack according to an exemplary embodiment and a comparative example of the present invention.
Figure 6B:
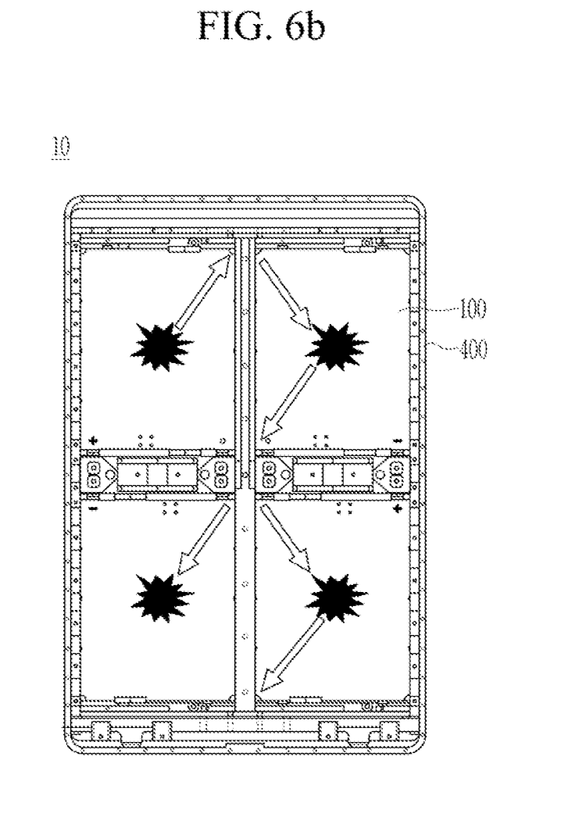

According to this configuration, even when the thermal issue occurs in the battery module 100 positioned away from the burst portion 500 as shown in FIG. 6a, the heat and flame occurring therein may be induced outward and emitted without affecting the neighboring modules. On the other hand, in a case of the conventional battery pack 10 to which such a structure of the vent frame 300 is not applied, the venting gas (gas and flame in the high temperature and high pressure) occurring in a module 1 may be randomly transferred to all of modules 2 to 4. As a result, all the modules in the battery pack 10 may be exposed to a risk in which a temperature rise and a series of additional thermal runaway occur therein.

As described above, an exemplary embodiment of the present invention may include the vent frame 300 which may serve as the support frame stably supporting the battery module 100 in the normal times, and induce the occurring high-pressure venting gas (gas and flame in the high temperature and high pressure) to the path in the vent frame 300 to stably emit the same to the outside of the battery pack 10 when the thermal issue occurs in the battery pack 10, thereby preventing diffusion of the gas and flame to the neighboring modules.

The battery module described above and the battery pack including the same may be applied to various devices. Such a device may be applied to transportation means such as an electric bicycle, an electric vehicle and a hybrid vehicle. However, the present invention is not limited thereto and may be applied to various devices which may use the battery module and the battery pack including the same, which also belongs to the scope of the present invention.

Although the exemplary embodiments of the present invention have been described in detail hereinabove, the scope of the present invention is not limited thereto. Various modifications and alterations made by a person of ordinary skill in the art by using a basic concept of the present invention as defined in the following claims fall within the scope of the present invention.

DESCRIPTION OF SYMBOLS

10: battery pack
100: battery module
110: module frame
120: end plate
121: vent gate
200: pack tray
300: vent frame
310: vertical beam
320: horizontal beam
311: cover of vertical beam
312: passage of vertical beam
321: cover of horizontal beam
322: passage of horizontal beam
324: first connection hole
314: second connection hole
326: third connection hole
400: housing
410: lower housing
420: upper cover
500: burst portion

The invention claimed is:

1. A battery pack comprising: a plurality of battery modules; a vent frame disposed along the edges of the plurality of battery modules; and a housing accommodating the plurality of battery modules and the vent frame, wherein the vent frame includes a pair of vertical beams formed parallel to a first direction and a pair of horizontal beams formed parallel to a second direction intersecting the first direction, and wherein the vertical beam and the horizontal beam each have a shape of a tube and include a cover formed on the vertical beam or the horizontal beam in a length direction, and a passage surrounded by the cover for gas to pass through and
wherein each of the battery modules includes a battery cell stack in which a plurality of battery cells are stacked, a module frame accommodating the battery cell stack, and an end plate covering the battery cell stack exposed to each of two ends of the module frame, and wherein the end plate includes at least one vent gate formed in the shape of a tube externally protruding from the battery pack end plate and communicating with the inside of the battery module.

2. The battery pack of claim 1, wherein
the cover of the horizontal beam includes at least one first connection hole opposite to one of the plurality of battery modules, and
wherein the vent gate is formed opposite to the at least one first connection hole for the vent gate and the horizontal beam having the shape of a tube to communicate with each other.

3. The battery pack of claim 2, wherein
the cover of any one of the vertical beam and the horizontal beam includes a second connection hole formed at a portion where the vertical beam and the horizontal beam intersect with each other and communicating with the passage of any one of the vertical beam and the horizontal beam.

4. The battery pack of claim 3, further comprising
at least one burst portion formed on the outside of any one of the horizontal beam and the vertical beam and connected to the passage.

5. The battery pack of claim 4, wherein
the vent gate, the at least one first connection hole, the passage of the horizontal beam, the second connection hole and the passage of the vertical beam are all connected with one another.

6. The battery pack of claim 4, wherein
the housing includes a lower housing including a bottom surface on which the plurality of battery modules are disposed and a side wall extended upward from the bottom surface, and an upper cover covering an opening of an upper portion of the lower housing, and
wherein the burst portion is coupled to the horizontal beam or the vertical beam while having the side wall of the lower housing interposed therebetween.

7. The battery pack of claim 6, wherein
the burst portion is connected to the passage of the horizontal beam or vertical beam, and is configured to burst when a pressure of introduced gas is a predetermined pressure or more.

8. The battery pack of claim 1, wherein
the cover of the vertical beam includes a first inner cover disposed adjacent to the battery module in the second direction, and a first outer cover disposed away from the battery module in the second direction, and
at least one of the first inner cover and the first outer cover includes a groove elongated in the first direction.

9. The battery pack of claim 8, wherein
the first inner cover includes two second connection holes positioned at both-ends of one surface thereof adjacent to the battery module in the second direction, the both-ends being adjacent to the horizontal beam.

10. The battery pack of claim 8, wherein
the groove elongated in the first direction forms the passage as the first inner cover and the first outer cover are coupled with each other.

11. The battery pack of claim 1, wherein
the cover of the horizontal beam includes a second inner cover disposed adjacent to the battery module in the first direction, and a second outer cover disposed away from the battery module in the first direction, and
wherein at least one of the second inner cover and the second outer cover includes a groove elongated in the second direction.

12. The battery pack of claim 11, wherein
the second inner cover includes at least one first connection hole formed in one surface thereof adjacent to the battery module in the first direction.

13. The battery pack of claim 11, further comprising
a burst portion disposed on the outside of the second outer cover in the first direction and connected to the passage of the horizontal beam,
wherein the second outer cover includes at least one third connection hole for its communication with the burst portion.

14. The battery pack of claim 11, wherein
the groove elongated in the second direction forms the passage as the second inner cover and the second outer cover are coupled with each other.

15. A device comprising at least one battery pack according to claim 1.

* * * * *